A. R. DAVIS.
COMBINATION PAN LIFTER AND LID HOLDER.
APPLICATION FILED FEB. 15, 1908.
917,929.
Patented Apr. 13, 1909.
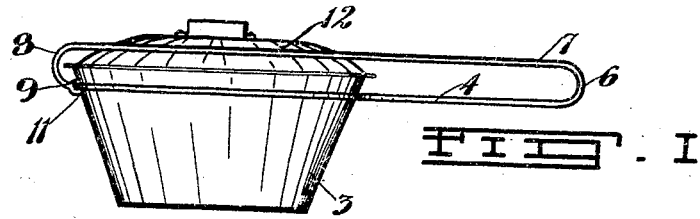
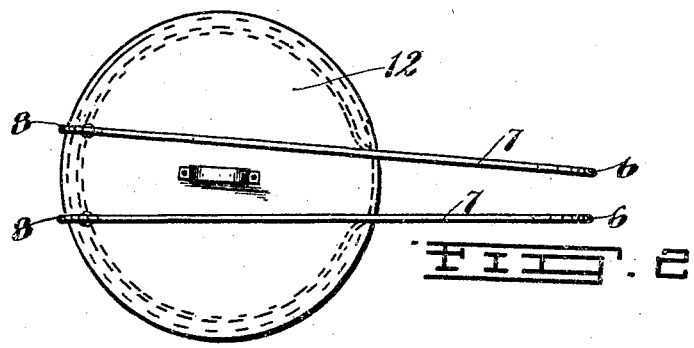
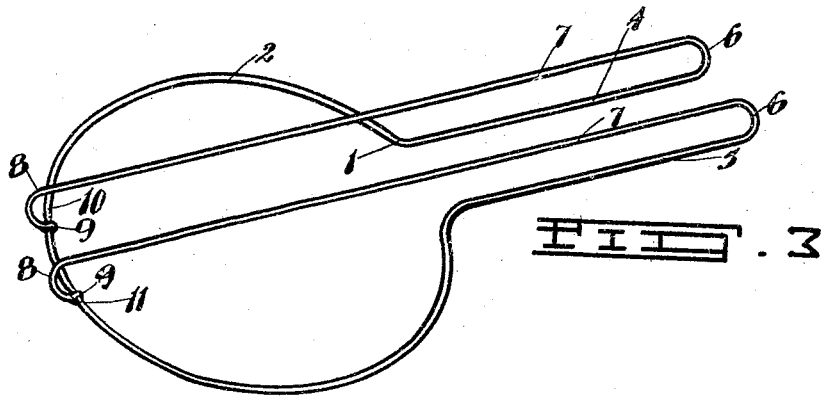
WITNESSES
Gilbert J. Thomson.
Gerald S. Roysbaugh
INVENTOR.
A. R. Davis
By
His Attys

UNITED STATES PATENT OFFICE.

ALLAN ROSS DAVIS, OF WINNIPEG, MANITOBA, CANADA.

COMBINATION PAN-LIFTER AND LID-HOLDER.

No. 917,929.　　　　Specification of Letters Patent.　　　Patented April 13, 1909.

Application filed February 15, 1908. Serial No. 416,011.

*To all whom it may concern:*

Be it known that I, ALLAN ROSS DAVIS, of the city of Winnipeg, in the Province of Manitoba, Canada, surveyor, have invented certain new and useful Improvements in a Combination Pan-Lifter and Lid-Holder; and I do hereby declare the following to be a full, clear, and exact description, which will enable others skilled in the art to which it appertains to make and use the same.

My invention relates to combination pan lifters and lid holders; and it consists in the novel construction and combination of parts herein fully described and claimed.

Figure 1 is a side view of the invention showing it applied on a pan. Fig. 2 is a plan view as in Fig. 1, and Fig. 3 is an enlarged perspective view of the device alone.

In the drawings like characters of reference indicate corresponding parts in each figure.

The pan lifter and lid holder is formed from a single length of wire 1 looped centrally at 2; such loop being adapted for engaging with the body of the pan 3. The two ends 4 and 5 of the wire after forming the loop, extend backwardly, and are then turned upwardly at 6 and pass forwardly at 7; the extremities being then curved downwardly at 8 and fastened to the loop below at 9. The backwardly extending ends 4 and 5 together with the forwardly extending portions 7 form a convenient handle, as will readily be seen. I consider it very advisable to kink the wire of the loop in two places at 10 and 11, at which points the fastenings 9 are made. The upper portions 7 are devised for holding the lid 12 of the pan in position once the pan is grasped by the lifter.

When it is desired to use the article the loop is passed over the pan from above by simply spreading the handle pieces apart. When the two pieces forming the handle are squeezed together by the pressure of the hand the pan is caught tightly by the loop, and if there be a lid on the pan it is impossible for it to fall or slide off, on account of the members 7.

What I claim as my invention is:

A combined pan and lid lifter composed of a single length of wire bent centrally to form a loop and having the ends passing backwardly to form a handle, said ends then being carried forwardly parallel to each other and to the handle portion and connected to the top of the loop so as to form means for holding the lid in position.

Signed at Winnipeg, in the Province of Manitoba, this 3rd day of February, 1908.

ALLAN ROSS DAVIS.

Witnesses:
　GERALD S. ROXBURGH
　M. A. SOMERVILLE.